US009251619B2

(12) United States Patent
Lefebvre et al.

(10) Patent No.: US 9,251,619 B2
(45) Date of Patent: Feb. 2, 2016

(54) IMAGE SYNTHESIS DEVICE

(75) Inventors: Sylvain Lefebvre, La Fouillouse (FR); Samuel Hornus, Nancy (FR); Anass Lasram, Vandoeuvre-les-Nancy (FR)

(73) Assignee: INRIA INSTITUT NATIONAL DE RECHERCHE EN INFORMATIQUE ET EN AUTOMATIQUE, Le Chesnay (FR)

( * ) Notice: Subject to any disclaimer, the term of this patent is extended or adjusted under 35 U.S.C. 154(b) by 298 days.

(21) Appl. No.: 13/808,722

(22) PCT Filed: Jul. 7, 2011

(86) PCT No.: PCT/FR2011/051617
§ 371 (c)(1),
(2), (4) Date: Mar. 18, 2013

(87) PCT Pub. No.: WO2012/004537
PCT Pub. Date: Jan. 12, 2012

(65) Prior Publication Data
US 2013/0176310 A1 Jul. 11, 2013

(30) Foreign Application Priority Data
Jul. 9, 2010 (FR) ..................................... 10 02902

(51) Int. Cl.
*G06T 15/04* (2011.01)
*G06T 3/00* (2006.01)
*G06T 19/00* (2011.01)
(52) U.S. Cl.
CPC ............... *G06T 15/04* (2013.01); *G06T 3/0012* (2013.01); *G06T 19/00* (2013.01)

(58) Field of Classification Search
CPC ........ G06T 15/04; G06T 3/0012; G06T 19/00
USPC ..................................................... 345/619, 33
See application file for complete search history.

(56) References Cited

U.S. PATENT DOCUMENTS

| 6,563,964 | B1 | 5/2003 | Hallberg | |
|---|---|---|---|---|
| 2004/0046896 | A1* | 3/2004 | Koga et al. | 348/700 |
| 2011/0069765 | A1* | 3/2011 | Huang | 375/240.29 |

FOREIGN PATENT DOCUMENTS

EP 1026630 A2 8/2000

OTHER PUBLICATIONS

Matthew Brand et al; "Image and Video Retargetting by Darting", Jul. 6, 2009, Image Analysis and Recognition, Springer Berlin Heidelberg, Berlin, Heidelberg, pp. 33-42, XP019122401.
(Continued)

*Primary Examiner* — Matthew D Salvucci
(74) *Attorney, Agent, or Firm* — Troutman Sanders LLP

(57) ABSTRACT

An image processing device, including an analyzer calculating cutting data and difference data from image data, a selector receiving data from a working node, the data including cutting data, cost data, and position data, an assembler receiving data from working nodes and from a predecessor node and calculating updated node data as a function of the cost data, a driver configured to call the analyzer with image data of an input image, call the selector with an input node and with the cutting data calculated by the analyzer, call the assembler with the successor nodes determined by the selector as working nodes and with the input node as a predecessor node, and repeatedly call the selector and the assembler using one of the updated nodes as a working node for the selector, until a condition relating to the cutting data and the position data of an updated node is satisfied.

8 Claims, 3 Drawing Sheets

(56) References Cited

OTHER PUBLICATIONS

Dongfeng Han et al; "Optimal multiple-seams search for image resizing with smoothness and shape prior", The Visual Computer; International Journal of Computer Graphics, Springer, Berlin, DE, vol. 26, No. 6-8, Apr. 14, 2010, pp. 749-759, XP019845852.

Avidan S et al; "Seam carving for content-aware image resizing", ACM Transactions on Graphics, ACM, US, vol. 26, No. 3, Jul. 1, 2007, pp. 10-1-10-9, XP007904203.

Vaquero et al; "A survey of image retargeting techniques", Proceedings of SPIE, SPIE, USA, vol. 7798, Jan. 1, 2010, pp. 779814-1-779814-15, XP009144529.

Lefebvre S et al; "By-example synthesis of architectural textures", ACM Transactions on Graphics 2010 Association for Computing Machinery USA, vol. 29, No. 4, Jul. 26, 2010, XP002661153.

International Search Report, dated Nov. 4, 2011, which issued during the prosecution of International Patent Application No. PCT/FR2011/051617, of which the present application is the national phase.

* cited by examiner

IMAGE SYNTHESIS DEVICE

CROSS-REFERENCE TO RELATED APPLICATIONS

The present application is a National Stage of International Application PCT/FR2011/051617 ("PCT '617") filed Jul. 7, 2011 and published as WO 2012/004537 on Jan. 12, 2012. PCT '617 claims priority to French Application No. 1002902 filed Jul. 9, 2010. All of the applications are incorporated herein by reference.

FIELD OF THE INVENTION

The invention relates to image synthesis.

BACKGROUND

In modern computer processing, computation capacities have increased exponentially, to the point that immersion in three dimensional universes is now possible.

Managing these universes and seeking to make them increasingly more realistic for users nevertheless conflicts with the time necessary to create these universes, as well as the technical limitations particularly relative to capacity and memory access.

To manage this problem, systems have been designed that use limited inventories of images that are manipulated to give an illusion of variety, for example by applying those images on the three-dimensional surfaces to give them a varied appearance.

However, the quality of the resulting images is unsatisfactory if the images are reused on varied surfaces. Furthermore, if one wishes to adapt each image to its substrate surface to improve the quality, it is necessary to store all of the resulting images individually, which is a clear waste of storage space.

The invention aims to improve the situation.

SUMMARY

To that end, the invention relates to an image processing device including an analyzer capable of calculating associated cutting data and difference data from image data, the cutting data comprising coordinates of the image and designating a pair of parallel paths in the image, and the difference data representing a difference between attributes of the image data along each pair of parallel paths, a selector receiving input data from a working node and cutting data and configured to obtain therefrom so-called successor node data on the basis of a selection rule, the data of a node including cutting data, cost data, and position data, and an assembler receiving input data from working nodes and data from a predecessor node and capable of calculating updated node data as a function of the cost data on at least some of the working nodes, the cost data of the predecessor node and the difference data associated with the cutting data of the working nodes. Further, a driver configured to call the analyzer with image data of an input image, call the selector with an input node as the working node and with the cutting data calculated by the analyzer, call the assembler with at least some of the successor nodes determined by the selector as working nodes and with the input node as a predecessor node, and repeatedly call the selector and the assembler using one of the updated nodes as a working node for the selector, using the successor nodes resulting from said call as working nodes and the updated node as a predecessor node for the assembler, until a condition relating to the cutting data and the position data of an updated node is satisfied.

This device and method are novel, as they make it possible to generate new images similar to the reference images, but the sizes of which are adapted to their substrate surface.

For example, if a three-story façade image is applied on a surface of a four-story building, a distortion can be observed. Owing to the invention, a new façade image, resembling the original but having the right number of floors, can be generated.

Furthermore, its storage and display can be done in a very compact form. The invention is not, however, limited to façades, but applies to any image having enough repetitions along horizontal or vertical translations.

BRIEF DESCRIPTION OF THE DRAWINGS

Other features and advantages of the invention can better appear upon reading the following description, drawn from examples provided as an illustration and non-limitingly, drawn from the drawings, in which.

DETAILED DESCRIPTION

The drawings and descriptions below essentially contain elements of a definite nature. They may therefore not only serve to better understand the present invention, but may also contribute to the definition thereof if necessary.

The present invention involves elements subject to copyright protection. The holder of the rights does not object to the identical reproduction by anyone whosoever of this patent document or its description, as it appears in official documents. For the rest, it reserves all of its rights.

Figure 1:
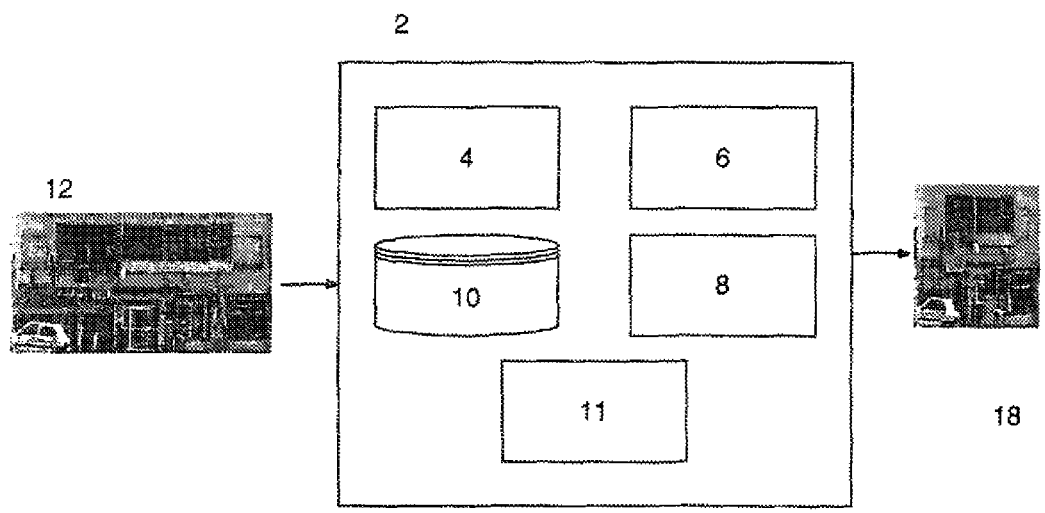
FIG. 1 is a schematic diagram of a device according to an example of the invention.

FIG. 1 shows a schematic diagram of a device 2 according to the invention.

In the example described here, the device 2 receives an input image of size M×N as well as a target width W, and produces an output image of size W×N resembling the input image.

The device 2 includes an analyzer 4, a selector 6, an assembler 8, a rule base 10, and a driver 11 to control them.

Figure 2:
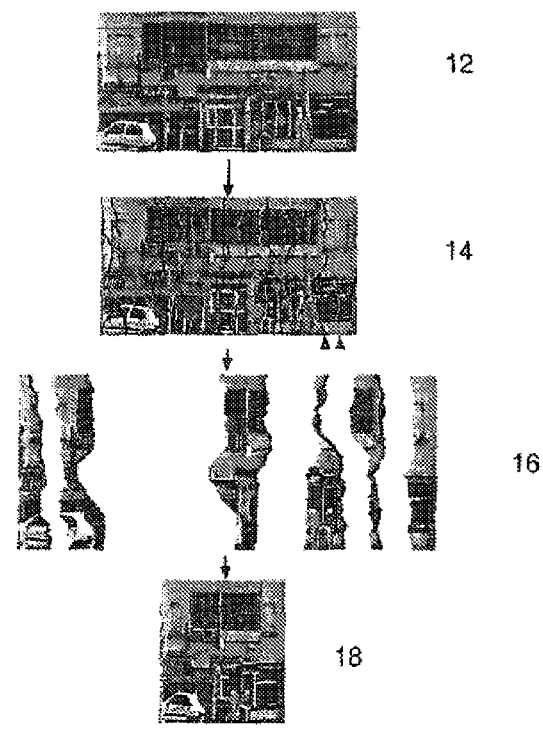
FIG. 2 shows a schematic overview diagram of an image with the device of FIG. 1.

As shown in FIG. 2, the device 2 receives an input image 12. In a first operation, the device 2 calls the analyzer 4 with the input image 12. At the end of the operation, the analyzer 4 produces a file that comprises data defining a cutting plane of the input image.

The cutting plane comprises a list of series of coordinates in the image, each series defining a path in the input image. To embody that cutting plane, an image 14 is shown in which the paths of the cutting plane are shown superimposed on the input image 12.

Each broken line has a least one other broken line parallel to it: they may be superimposed exactly. This correspondence is stored in the file produced by the analyzer 4.

These broken lines are hereafter referred to as "cuttings," and in the example described here, they are oriented vertically relative to the display of the image: each cutting separates the image into two left and right parts.

Figure 3:
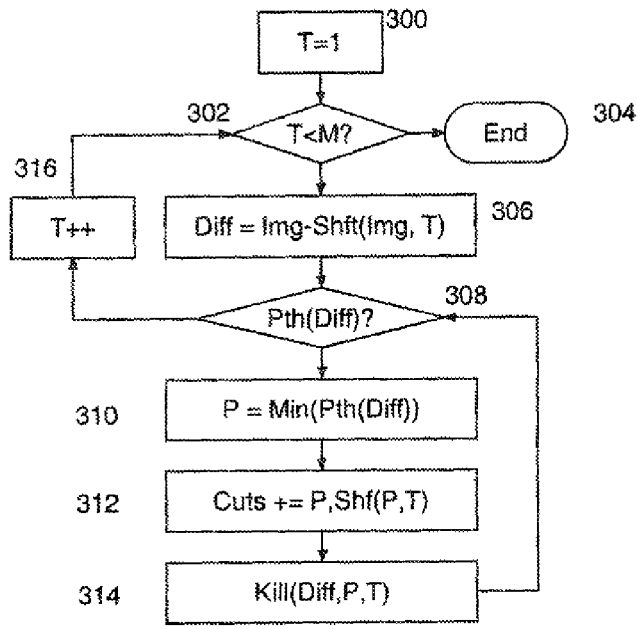
FIG. 3 shows an example of operations carried out by the device of FIG. 1 according to FIG. 2.

FIG. 3 shows an example embodiment of the analyzer 4.

The analyzer 4 looks for pairs of paths between the upper edge and lower edge of the image, such that the two paths are strictly parallel and have similar colors.

The two sought paths being parallel, it is possible to superimpose them exactly by a translation T. These paths are called "cuttings" because it is possible to cut the image along these two paths so as to remove or repeat a piece thereof.

The cost (or quality) of the paste, i.e., the possibility for a user to perceive a visual defect, depends on the similarity between the colors along the pair of paths.

There are a large number of possible pairs of cuttings separated by different distances and offering varying paste qualities.

Although it is possible to use cuttings with any shapes, the Applicant has chosen to restrict the search for cuttings to paths with a simple shape, so as to simplify the storage thereof. In particular, a cutting always advances strictly from top to bottom and cannot move by more than one pixel on the x-axis for each pixel descended on the y-axis.

The search for cuttings is an important step: too many cuttings would weigh down the processing needlessly, while too few cuttings would prevent the assembler 8 from producing good quality synthesized images.

The analyzer 4 of the example described here is a compromise between obtaining good quality parallel cuttings (i.e., having a small color difference) and obtaining a good distribution of cuttings in the image, so that the assembler 8 has enough choices.

The analyzer 4 receives an input image Img of size M×N and produces, as output, a plurality of parallel cuttings in a file Cuts.

The analyzer 4 implements an algorithm that executes a global loop whereof each iteration runs a plurality of local loops. To that end, an index of width T varying between 1 and M−1 is initialized in an operation 300.

In an operation 302, it is verified whether T is equal to M−1, which would mean that all of the possible widths have been tested. If that is the case, then the algorithm ends in an operation 304.

The operations 306 to 316 describe the execution of an iteration of the global loop. Each iteration of the global loop finds, for each possible width T, a set of parallel cuttings that do not intersect for that width. It can, however, be noted that cuttings associated with two different widths, and therefore determined in iterations distinct from the global loop, may intersect.

The principle of discovering a pair of parallel cuttings is to use a difference map Diff, and therefore to find a unique path on that map. To that end, the map Diff is calculated in the operation 306 as the color difference between the pixels of the image Img and those of its translation by T pixels to the right. Alternatively, other attributes of the data of the image may be used, such as the chrominance, brightness, or saturation.

A path in the map Diff therefore corresponds to two paths in the image Img:

a first path that has the same coordinates as the path of Diff, and a second path, shifted by T pixels to the left in the image Img.

These two paths are parallel by construction. The color matching between these paths corresponds to the sum of the color values of the pixels along the path in the map Diff. This sum concretely corresponds to the some of the differences between the pixels along the path, i.e. the cost of the path.

Each local loop is formed by the operations 308 to 314, and chooses a path P in the map Diff, and stores the corresponding cuttings in the file Cuts.

To determine whether cuttings remain to be found for the current width T, a function Pth() is called in the operation 308. This function looks in the map Diff for all possible paths according to the rule described above, i.e. always strictly from top to bottom and without moving by more than one pixel along the x-axis for each pixel descended on the y-axis, and only retains the paths that do not have a so-called infinite cost. The notion of infinite cost is clarified below.

If the function Pth() does not find any path, then the global loop has finished its current iteration, and the index T is incremented in operation 316, then the global loop starts again in 302.

Otherwise, in the operation 310, the function Min() returns the path P of the map Diff that has the lowest cost. Then, in an operation 314, cuttings corresponding to the path P are stored in the file Cuts, with the associated cost of the path P.

Lastly, in the operation 316, a function Kill() modifies all of the pixels of the map Diff comprised between the path P and the path P shifted by T pixels to the right and left to yield a value indicating an infinite cost. This value may be chosen arbitrarily or may be a particular sign.

The role of the function Kill() is to guarantee that all of the local loops after the current local loop produce cuttings not secant to those previously determined. Additionally, since in the worst case, the path P is T pixels wide, the T pixels following P are eliminated from the following local loops, while assigning them an infinite cost.

This makes it possible to avoid needlessly accumulating too many parallel cuttings in the same region of the image. The operation 310 guarantees that only the best possible pair of cuttings is retained for the width T, i.e., that with the smallest cost.

The algorithm therefore finds that the compromise between the quality and quantity objectives of the cuttings.

As seen above, the cost corresponds to the sum of the differences between the colors of pixels associated with the two parallel paths (more generally the difference in image attribute if an attribute other than the color is selected). Two non-parallel cuttings are not superimposable, and therefore not comparable.

Furthermore, as can be seen hereafter, associating two non-parallel cuttings does not cause a visual difference. For that reason, the cost associating two non-parallel cuttings is defined as zero.

In the example described here, cost data only exists for parallel cuttings, and all of the other cutting associations have an implicit zero cost. Alternatively, this may be explicit.

It is assumed that the parallel cuttings never have a zero cost (i.e., there is no perfect match). This may be guaranteed by adding a low non-zero value to the match cost of all of the pairs of parallel cuttings. In practice, this case is very rare, except on artificial images. Other strategies are possible to avoid this problem.

A secant cutting here refers to the fact that there is a portion of the original image in which the x-axis of the first cutting is smaller than that of the second cutting, and another portion of that image in which the x-axis of the second cutting is smaller than that of the first cutting. In other words, when one looks at the "paths" associated with these cuttings, they intersect.

For a given cutting, there is a set of cuttings that is particularly interesting. The set comprises so-called "frontal" cuttings. A cutting is said to be frontal with respect to a given cutting if the frontal cutting is situated all the way to the right of the given cutting and if there is no other cutting that is completely situated between it and the given cutting. "Completely situated between" means that there are no cuttings whereof all of the points are strictly situated between those of the given cutting and those of the frontal cutting.

Several cuttings secant with respect to one another may be frontal with respect to a given cutting. As can be seen below, the selection of frontal cuttings is important to find the solution more effectively. In fact, they can make it possible to reduce the number of possibilities examined, while their definition guarantees that no possible solution is dismissed.

Figure 5:
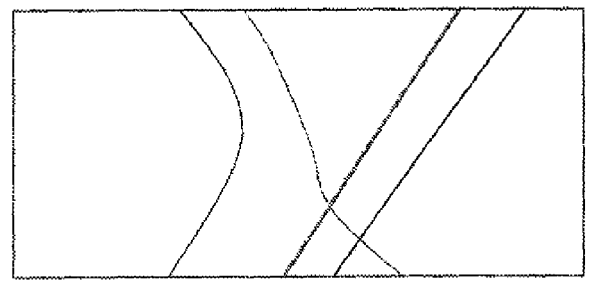
FIG. 5 shows an example of cuttings according to an example of the invention.

FIG. 5 makes it possible to better understand the notion of a frontal cutting. As can be seen in the figure, the given cutting is the leftmost cutting.

In that figure, the two cuttings that have their x-axis on the upper edge closest to that of the given cutting are frontal cuttings, and not the third. In fact, for each of these, there is no cutting between them and the given cutting.

However, the last (rightmost) cutting is not frontal relative to the given cutting because the frontal cutting having the x-axis on the rightmost upper edge is completely contained between the given cutting and that cutting.

Alternatively, it would be possible to look for paths by threes or fours instead of looking for them by pairs. Furthermore, as seen relative to the description of FIGS. 3 and 5, one may use the term path or cutting equivalently inasmuch as a path has been selected in a local loop. A frontal cutting may thus also be called a frontal path.

Once the analyzer 4 has calculated the cuttings in the input image 12, a loop is launched in which the selector 6, the assembly 8 and the rule base 10 interact to produce a set 16 of synthesized image pieces.

Lastly, the set 16 of synthesized image pieces can be assembled to form a synthesized image 18.

Figure 4:
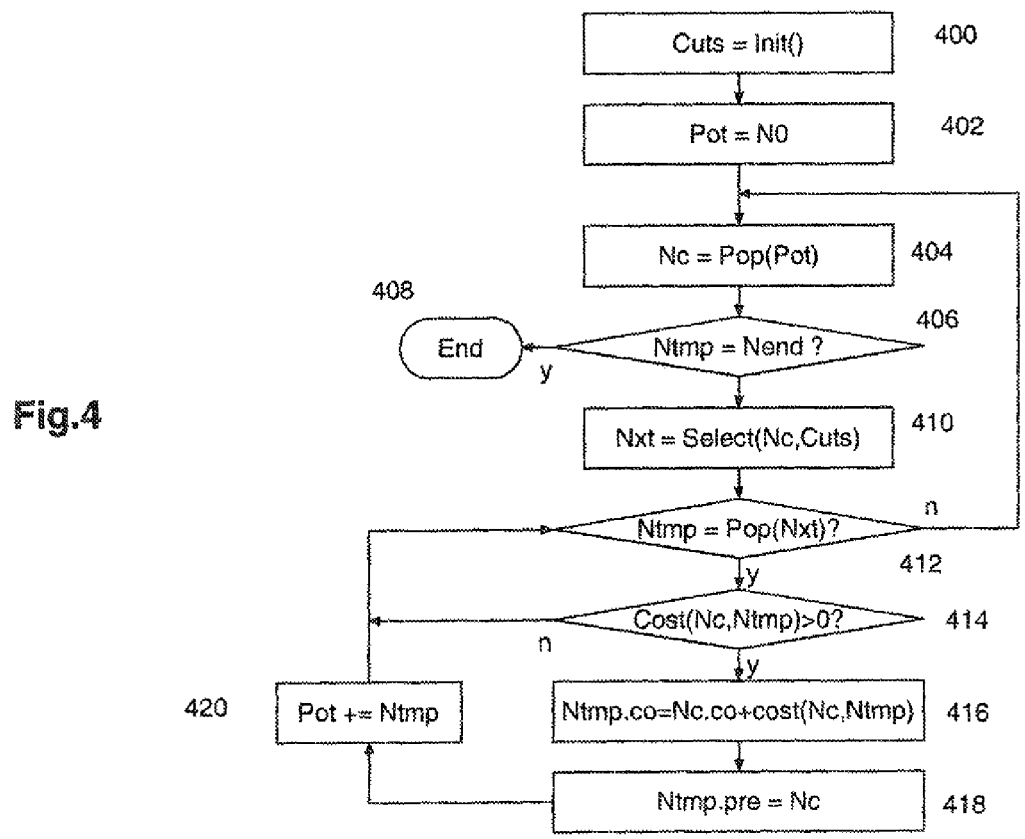
FIG. 4 shows a flowchart of the implementation of another part of FIG. 2 by the device of FIG. 1.

FIG. 4 shows an example embodiment of the loop that produces the set 16. In this example, the synthesized image is enlarged or reduced along the horizontal dimension.

The operating concept used by this loop is now described.

In order to simplify image generation, and to be able to store the images at a lower cost, the Applicant resolved to use the advantages related to the cuttings. As seen above, a cutting is a path in the image in a direction, here between the upper and lower edges of the image, that has at least one "parallel path" having similar colors in that image all along it.

Thus, if one pastes the part of the original image following the "parallel cutting" after a given cutting, the human eye can not see the difference in most cases. It then becomes possible to enlarge or reduce the size of a base image while considerably reducing artifacts, and while adding variety.

This is done by the juxtaposition of the series of cuttings of the original image, which are filled between them by the content corresponding to the original image. This for example appears with the set 16.

This example is very advantageous, as it becomes possible to create a multitude of synthesized images from a single base image, and to describe them only with that image, the cuttings it contains, and a plurality of lists of successive cuttings for each image.

The work to reconstruct a synthesized image from its list of cuttings is in fact not very greedy in terms of calculation time. It is nevertheless necessary to choose the cuttings wisely.

Furthermore, in modeling a three-dimensional building, it is necessary for the corners to match, which requires keeping the left and right edges of the original image. In other applications, this limitation may be ignored, and the start and end edges may be chosen in the image by the user.

The Applicant's work has therefore led to studying the most effective way to choose the list of successive cuttings in the image so as to obtain a final image of the selected size.

As can appear with the following description of the loop for generating the set 16, the Applicant has implemented an adapted version of the Dijkstra algorithm. Here, the aim is to start from the left edge of the image, and to reach the right edge of the image, while selecting the cuttings between the two to obtain the desired length of the synthesized image.

To that end, the selector 6 chooses, at each iteration, the list of cuttings that can be used from among the following list:
cutting(s) "parallel" to the cutting in progress,
the set of so-called "frontal" cuttings.

These selection conditions form a first selection rule that is stored in the rule base 10. Other rules are described later.

It can be noted that selecting the cutting(s) "parallel" to the cutting in progress makes it possible to "go backwards" or "jump forwards" in the original image to form the synthesized image, which makes it possible to generate enlarged or reduced synthesized images with the smallest possible quantity of visual artifacts.

Furthermore, this set is reduced, which simplifies the complexity of the algorithm, while not ignoring any possible combinations, owing in particular to the frontal cuttings.

The Dijkstra algorithm is implemented as follows:
when one of the cuttings "parallel" to the cutting in progress is chosen, the cost is increased by the difference between those cuttings, and the length of the synthesized image is not increased. The distance between the cuttings refers to the error, the difference between the pixels of the original image along the cuttings. This information is available directly from the work of the analyzer 4;
when a frontal cutting is selected, the cost is not increased, as that amounts to reproducing part of the original image, and the length of the synthesized image is increased by the length that separates the current cutting from the selected frontal cutting;
the algorithm stops when the right edge of the image is chosen, and the length of the synthesized image is equal to the desired length. All that remains is then to go up the list of "precedents" established by the algorithm to see the list of cuttings, up to the left edge.

However, the algorithm operates not based on the cuttings, but based on nodes. A node here refers to the pair formed by a cutting identifier and a position of that cutting in the synthesized image.

As can be seen below, a current node has several attributes:
the predecessor of that node, i.e., the node that is considered the least costly to reach the current node,
the cost that is associated with that node, i.e. the sum of the differences between all of the cuttings encountered before reaching that node.

The loop starts in operation 400 by calling a function Init() by the driver 11.

The role of the function Ink) is to initialize the variables and global parameters of the synthesis loop of the image.

These parameters include the desired length W for the synthesized image. As can be seen with FIG. 6, this length may be specified by the user for each image he wishes to synthesize. It may also be generated automatically as a function of other parameters specified by the user and/or distribution models.

Another parameter is the file Cuts, which receives the set of cuttings identified in the image 12 by the analyzer 4, and which serves as a starting point for the algorithm. In the file Cuts, the cuttings are described by the list of coordinates of the points that define them, and the cuttings are ordered by increasing x-axes, i.e., the left edge of the image is the first cutting, followed by the cutting that contains the point for which the x-axis is lowest, and so forth.

In an operation 402, the cutting that corresponds to the left edge of the image is chosen as the starting point. The corresponding node here is denoted N0 and has a zero x-axis in the synthesized image, a zero associated cost, and no predecessor. The node N0 is stored in a list Pot.

Once this is done, the initialization of the loop is complete, and the loop, as such, runs.

In a first operation 404, the list Pot is opened using a function Pop() As can be seen below, this always involves the node having the lowest cost. The result of this opening is stored in a current node Nc, and that node is entered into a list of already optimized nodes.

Then, in an operation 406, a test verifies whether the algorithm is complete, i.e., whether the cutting of the node Nc is the right edge of the image, and whether the length of the image is the desired length.

If that is the case, the loop ends in 408. Otherwise, in operation 410, the driver calls the function Select() with the current node Nc. The result of that call is stored in a list NXT.

In the function Select() the selector 6 selects the list of cuttings from the file Cuts that correspond to the cutting of the current node Nc according to the selection criteria explained above. Then, those cuttings are arranged in the form of nodes in the list Nxt, as a function of the length associated with each cutting.

Thus, if the position of the cutting of the current node Nc is p, and I is the length of the transition of the cutting of the current node Nc toward a cutting c from the file Cuts, then a node is created in the list Nxt that has the cutting c as cutting, and a position q=p+1 as position.

In the case where such a node has already been encountered and is in the list Pot, then the attributes of that node are copied from the list Pot, i.e., its predecessor node and the cost of that node. Otherwise, that node is new, and the predecessor is not initialized, while the cost associated with that node is initialized with an "infinite" value. An infinite value refers either to data indicating that the cost has never been calculated, or data corresponding to a very high cost.

The function Select() is provided to arrange the list Nxt ordered by increasing transition costs. The transition cost here refers to the cost associated with the difference between the cutting of the node Nc and the cutting of each node of the list Nxt. Alternatively, the function Select() can perform a sort by another attribute.

Then, the driver 11 calls the assembler 8 in a series of operations 412 to 420 to update the cost attributes of the nodes according to the Dijkstra algorithm.

This series of operations is a loop that begins in step 412 by opening the list Nxt in a node Ntmp. If the node Ntmp is in the list of nodes already optimized, then that node is ignored and the operation 410 is repeated, since the cost of that node cannot be improved.

When Ntmp exists, a test 414 uses a function Cost() to verify whether the cost of the node Ntmp can be decreased. To that end, the function Cost() compares the cost of the node Ntmp with the addition of the cost of the current node Nc to the cutting of the node Ntmp.

If the cost of the node Ntmp is higher, that then indicates that it is possible to reach that node more economically by passing through the current node Nc.

Then, the cost of the node Ntmp is updated in operation 416 by adding the transition cost of the cutting of the current node Nc toward the cutting of the node Ntmp to the cost associated with the current node Nc. As seen above, this passage cost is zero when the cutting of the node Ntmp is not a parallel cutting. Then, in an operation 418, the current node Nc is indicated as the predecessor of the node Ntmp.

Then, the list Nxt is opened again in the operation 412. Before that, the node Ntmp is put back in the list Pot in an operation 420. This operation is carried out in an ordered manner, i.e., the node Ntmp is introduced into the list Pot as a function of the cost associated with it. In the case where the node Ntmp is already in the list Pot, its cost and predecessor attributes are updated and the list Pot is sorted accordingly.

When the operation 412 determines that the list Nxt is empty, the loop is reiterated in step 404 with a new opening of the list Pot.

In the preceding, it appears that each node of the list Pot associated with its predecessors represents one possible partially synthesized image alternative. The algorithm is optimized to stop once the most faithful synthesized image, i.e., with the lowest cost and the right length, is found. The right length means that the position of the last node is equal to the desired length of the synthesized image, and the cutting of that node is the right edge.

The algorithm described in FIG. 4 is therefore very high-performing and makes it possible to produce, with a low calculation cost, a representation, which in turn has a low weight, of a synthesized image with very few artifacts.

However, this algorithm is perfectible. In fact, as a function of the distribution of the costs associated with the parallel cuttings and due to the fact that a shorter path is always made up of shorter paths in turn, the synthesized image may include a high repetition of a particular pattern from the original image.

To avoid this problem, the function Select() may be modified to implement a plurality of selection rules in addition to the first rule mentioned above.

The first rule described above may be varied by making it possible to choose, as non-parallel cuttings, the cuttings situated to the left of the current cutting, i.e., one making it possible to go backwards with all of the cuttings, and not only the parallel cuttings. In that case, the copied image piece is reversed, as it is copied from right to left.

A second rule may be based on the limitation of the number of repetitions of a column of the input image 12 in any portion of the synthesized image of a certain length. In this way, it is possible to ensure that the synthesized image does not contain visually displeasing repetitions.

To that end, it is necessary to maintain a table of occurrences for each column of the input image. That table is updated in the operation 404 from predecessors of the node Nc. That table contains the number of occurrences of the columns of the original image in the portion of the preceding partially synthesized image Nc and with the chosen length.

During the selection of the nodes in the operation 406, if the cutting of a given candidate node for the addition into the list Nxt is a frontal cutting, then a piece of the original image can be added to the synthesized image in progress. The table of occurrences is then consulted to verify that the increase in the number of occurrences due to that copy can not exceed a certain threshold. If the threshold is exceeded, the node is not added into the list Nxt.

A third rule operates similarly, but taking the entire synthesized image into account, instead of a selected length.

In the example described here, the columns used in its rules each describe a width of 1 pixel. In other alternatives, this width may be greater, or may vary.

A fourth rule may require variety between successively synthesized images. To that end, the selector 6 receives or has access to a list of synthesized images described by their cuttings, and thus therefore to the position of each of the columns of the original image in each already synthesized image.

The fourth rule may be not to allow the selection, as the following node, of the nodes whereof inclusion would cause a copy of the synthesized image of columns of the original image in a position close to that already done in the already synthesized images.

This may be done by going through the list Nxt produced by applying the first rule, combined or not combined with the second or third rule, and eliminating the nodes that do not meet this fourth rule.

Furthermore, to apply the second, third, and fourth rules, the calculations of tables of occurrences done for a given synthesized image may be reused for a subsequent synthesized image, as the algorithm is the same for all of the synthesized images. This makes it possible to avoid repeating a large number of calculations.

A fifth rule may require the reproduction of part of the original image at a specific location of the synthesized image, for example using a copy-paste interface. The area to be reproduced identically therefore has known coordinates in the synthesized image.

To apply this rule, the operation 406 must manage two situations:

a. a node added in the list Nxt has a cutting that, with the cutting of the current node, defines an area of the original image that is situated before the area to be reproduced identically in the synthesized image, or when the current node has a position situated after the area to be reproduced identically in the synthesized image, b. a node added in the list Nxt has a cutting that defines, with the cutting of the current node, an area of the original image that passes through the area to be reproduced identically in the synthesized image.

Cases a. and b. may be detected by comparing the coordinates in the synthesized image of the points associated with the cutting of the added node and those of the area to be reproduced identically.

In case a, the operation 406 is unchanged.

In case b, the selector must determine whether the cutting of the added node reproduces the area to be reproduced identically at the right coordinates. If yes, then that node is kept. If not, the added node is removed from the list Nxt. In the case where the added node is kept, the choice of the following node is very restricted, as its cutting must reproduce the rest (in whole or in part) of the area to be reproduced identically starting from that cutting.

A sixth rule consists of encouraging the columns to appear with shifts that follow the one-dimensional auto-correlation function of the original image. The auto-correlation function measures the distance of the image from its copy shifted by x pixels, for any value of x.

To that end, the transition cost is modified between two cuttings by adding an additional cost thereto that varies as the inverse of the correlation value for x equal to the shift (modulo W) between the position of the current cutting in the original image and its position in the image being synthesized, all multiplied by the deviation between the two cuttings relative to which the transition cost is considered.

In general, the fact that the shortest paths are themselves made up of shorter paths of a smaller size makes it possible, in the case where the rules applied do not depend on previous operations, to achieve significant gains in the calculations.

In fact, if the solution is calculated for a size W, the calculations done may be reused in full, and it is possible to obtain the solution for a size W+X more quickly.

In light of the state of the art, it appears to one skilled in the art that the algorithm previously described is a shortest path algorithm (Dijkstra algorithm) applied on a graph. Although the graph is not explicitly built, it is implicitly defined by the selection rules for the following nodes.

Any other shortest path algorithm, including A* or random approximate algorithms, may therefore be used equivalently.

Likewise, the graph corresponding to the rules described above may be built in memory explicitly, so as to perform various processing operations therein. Defining the graph implicitly as described above nevertheless allows more effective implementation of the synthesis of a new image.

The example described above was described in relation to a synthesis in the horizontal direction of an image. However, a synthesis in the vertical direction can be identical, with the exception that the cuttings can be horizontal in that case. Another possibility can be to impose a 90° rotation on the image, and to apply identical resizing to it.

When one wishes to perform two-dimensional resizing of an image, it is possible to:

calculate the vertical cuttings, perform a horizontal synthesis to obtain an intermediate image, calculate the horizontal cuttings in the intermediate image, perform a vertical synthesis to obtain the final image.

However, this requires recalculating the horizontal cuttings for each intermediate image. However, this is detrimental, since these cuttings can vary as a function of the horizontal resizing done first. The result therefore takes more time to generate.

Figure 6:
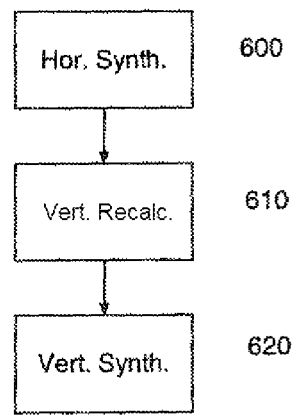
FIG. 6 shows an alternative of the diagram of FIG. 3.

The Applicant therefore established an algorithm shown in FIG. 6, which makes it possible to produce multiple synthesized images with a different bidirectional enlargement or shrinkage, while keeping only a single set of horizontal and vertical cuttings, which is that of the original images.

In the example described here, the invention receives an input image of size M×N, a target width W, and produces an output image of size W×N resembling the input.

The invention proceeds through two steps: given a target size of W×H pixels and an original image of size M×N, the invention first produces an intermediate image of size W×N from the image M×N, then secondly an image of size W×H from the intermediate image of size W×N.

It should be noted that the order of the operations is of little importance and that the operations performed horizontally and vertically are strictly equivalent. The rest of this example is limited to the horizontal case followed by vertical.

To that end, a horizontal synthesis operation is performed in an operation 600. This operation is identical to all of FIG. 4. The result is a list of vertical cuttings.

Then, in operation 610, the driver 11 calls the assembler 8 to apply a transformation to each horizontal cutting of the original image that corresponds to the list of vertical cuttings resulting from the operation 600.

Lastly, in an operation 620, the driver 11 performs a vertical synthesis operation, which is based on the transformed horizontal cuttings resulting from the operation 610.

This results in a list of horizontal cuttings that is stored with the list of vertical cuttings to form the synthesized image.

Thus, to reconstitute the synthesized image, one need only apply the horizontal synthesis defined by the list of vertical cuttings to the original image and the horizontal cuttings, then apply the vertical synthesis defined by the resulting horizontal cuttings to the resulting image.

Figure 7:
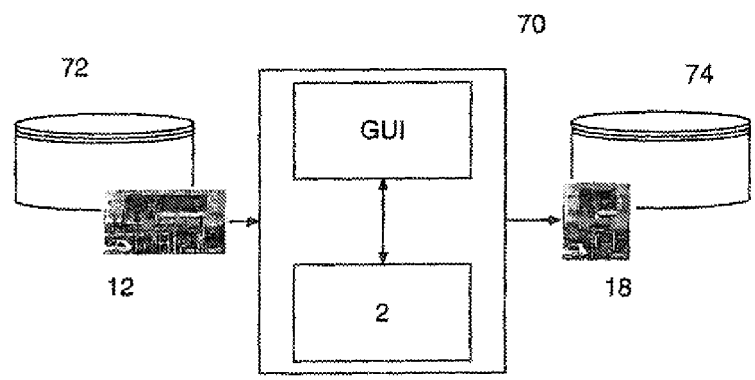
FIG. 7 shows an alternative of FIG. 1 in which the device is used to create a set of images to simulate a three-dimensional town.

FIG. 7 shows a universe synthesis system in which a server 70 is a user interface GUI and a device 2 as described above.

This server may be made in the form of a specialized integrated circuit, or a computer running a code that executes all of the functions and has all of the characteristics of the device 2.

Using the interface GUI, a user has the possibility of massively generating varied synthesized images, in batches.

To that end, the user has access to an original image database 72, and can program the device 2 to produce, for each image of the database 72, a desired number of synthesized images stored in the synthesized image database 74.

This production may be done by randomly or systematically applying a certain number of the rules from the rule base 10, and randomly or systematically varying the parameters of those rules.

The interface GUI also allows the user to create synthesized images having particular characteristics, for example by requiring the presence of a cutting of the original image at a specific location of a synthesized image.

To that end, the device 2 calculates two synthesized images, one starting from the left edge of the image and stopping at the concerned cutting, and the other image starting from the concerned cutting and stopping at the right edge of the image. Of course, this may be repeated by requiring several cuttings at several target locations.

Alternatively, the user may also require the reproduction of a target part of the original image in a target area of the synthesized image. This makes it possible to use a "drag and drop" of part of the original image, which simplifies the user experience. To that end, the device 2 may in particular apply the fifth rule.

Above, the second, third, fourth, and fifth rules have been described to improve the quality of the image synthesis. To that end, these rules limit the cuttings that may be used in the Dijkstra algorithm. They have been defined from a node that has first been added, then is removed as a function of these rules.

This means that the function Select() that implements them first operates as described relative to the first rule, then executes a second passage over the list Nxt to remove the nodes that have been added and do not meet the second and/or third and/or fourth and/or fifth rules.

Alternatively, the function Select() may be provided to implement all of the first to fifth rules in a single pass, i.e., a node is only added to the list Nxt if it meets all of the rules, through a priori tests.

To conclude, it appears that the synthesized images may be stored in two equivalent formats.

According to a first format, the original image and the list of cuttings are provided, and the synthesized images are formed from the list of cuttings of which they are made up.

When they must be used, the synthesized images are built by pasting the pieces of the original image situated between each pair of cuttings from the list of cuttings end to end.

This is particularly advantageous since the list of cuttings contains only one cutting identifier, and one identifier for the original image. Thus, when there are many synthesized images, this format takes up very little storage space relative to the storage of raw images.

It is also possible to determine the color of a point situated at the coordinates (x,y) of the synthesized image very quickly from the list of cuttings. To that end, a dichotomous search is done in the list of cuttings that are sorted by increasing order of position (the cuttings forming a synthesized image never intersecting).

This makes it possible to display the images on the screen or applied on three-dimensional objects by attaching textures without ever explicitly having to form the synthesized image in memory.

According to a second format, the synthesized images are stored directly in the form of images, i.e., after the list of cuttings has been established, the corresponding synthesized image is generated and stored.

This format may be useful when the calculation power is limited, and prevents on-the-fly generation of synthesized images from their respective lists of cuttings.

The approach that has been described above may be applied directly even on video data and volumes (in fact 3D images).

The approach also applies to 1D signals such as sounds, in which case the cuttings are reduced to a single coordinate and the matching cost may for example be given by a similarity matrix.

The paths then become layers that separate the volume in two in a direction, but the rest of the operation is globally unchanged.

In that case, it may be interesting to extend the algorithm described in FIGS. 4 and 6 to account for the number of dimensions of the layers, repeating the operations according to each of those dimensions.

More generally, it is possible to extend the algorithm of FIG. 6 to any number of directions.

The invention claimed is:

1. An image processing device, comprising:
an analyzer calculating associated cutting data and difference data from image data, the cutting data comprising coordinates of the image and designating a pair of parallel paths in the image, and the difference data representing a difference between attributes of the image data along each pair of parallel paths,
a selector receiving input data from a working node, which is one of a plurality of working nodes, and cutting data and configured to obtain therefrom so-called successor node data on the basis of a selection rule, wherein the data of at least one of the working node and the successor node includes cutting data, cost data, and position data,
an assembler receiving input data from working nodes and data from a predecessor node and calculating updated node data as a function of the cost data on at least some of the working nodes, the cost data of the predecessor node and the difference data associated with the cutting data of the working nodes,
a driver configured to:
call the analyzer with image data of an input image,
call the selector with an input node as the working node and with the cutting data calculated by the analyzer,
call the assembler with at least some of the successor nodes determined by the selector as working nodes and with the input node as a predecessor node, and
repeatedly call the selector and the assembler using one of the updated nodes as a working node for the selector, using the successor nodes resulting from said call as working nodes and the updated node as a predecessor node for the assembler, until a condition relating to the cutting data and the position data of an updated node is satisfied, wherein the working node data also comprises predecessor data, wherein the assembler is arranged to update the cost data of a given working node when the cost data of the given working node defines a value higher than the sum of the value defined by the cost data of the predecessor node added to the value defined by the difference data associating the given working node and the predecessor node, and wherein upon the repeated call from the selector and the assembler, the updated node used is that having the cost data designating the lowest cost.

2. The device according to claim 1, wherein the selection rule comprises selecting a successor node whereof the cutting data designates the path that forms a pair with the path designated by the cutting data of the working node, and whereof the position data is identical to that of the working node.

3. The device according to claim 2, wherein the selection rule also comprises selecting at least one successor node whereof the cutting data designates a path from among the set of frontal paths of the path designated by the cutting data of the working node.

4. The device according to claim 2, wherein the selection rule excludes selecting a successor node comprising cutting data associated with part of the image that is already associated with cutting data of a node directly or indirectly designated by the predecessor data of the given working node when the respective position data of those nodes indicates a position difference below a selected threshold.

5. The device according to claim 4, wherein, to apply the selection rule, the assembler maintains a table containing occurrence data for columns of the image as a function of the position data and cutting data and predecessor data associated with a given working node.

6. The device according to claim 1, wherein the cutting data is associated with one direction from among two non-parallel directions in the image, and wherein the driver is arranged first to operate with the cutting data associated with a first of the two directions until the condition relating to the cutting data and the position data of an updated node are met, then to operate with the cutting data associated with a second of the two directions until a second condition relating to the cutting data and the position data of an updated node are met.

7. The device according to claim 6, wherein the driver calls the assembler after the condition relating to the cutting data and the position data of an updated node is met, to apply a transformation, to the cutting data associated with the second direction, drawn from the cutting data associated with the last updated node and the nodes designated by its predecessor data.

8. An image processing method comprising, for an input image comprising the steps of:

calculating, with an analyzer, cutting data and associated difference data, the cutting data comprising coordinates for the image and designating a pair of parallel paths in the image, and the difference data representing a difference between attributes of the image data along each pair of parallel paths, selecting, with a selector, from data of an input node and cutting data resulting from the calculating step, data for so-called successor nodes based on a selection rule, wherein the data of at least one of the successor node and the input node comprises cutting data, cost data, and position data, updating, from the successor node data from the selecting step and data from the input node, successor node data as a function of the cost data of at least some of the successor nodes, that of the input node, and difference data associated with the cutting data of the successor nodes, repeating the selecting and updating steps, with one of the updated nodes as input for the selecting step, and with the resulting successor nodes and that updated node as inputs for the updating step, until a condition relating to the cutting data and the position data of an updated node are met, wherein the working node data also comprises predecessor data, updating, by an assembler, the cost data of a given working node when the cost data of the given working node defines a value higher than the sum of the value defined by the cost data of the predecessor node added to the value defined by the difference data associating the given working node and the predecessor node, and using the updated node, upon the repeated call from the selector and the assembler, having the cost data designating the lowest cost.

* * * * *